(12) United States Patent
Leung

(10) Patent No.: US 11,971,017 B2
(45) Date of Patent: Apr. 30, 2024

(54) ENERGY HARVESTING DEVICE

(71) Applicant: Chi Lam Leung, Singapore (SG)

(72) Inventor: Chi Lam Leung, Singapore (SG)

( * ) Notice: Subject to any disclaimer, the term of this patent is extended or adjusted under 35 U.S.C. 154(b) by 95 days.

(21) Appl. No.: 17/610,932

(22) PCT Filed: May 13, 2020

(86) PCT No.: PCT/SG2020/050272
§ 371 (c)(1),
(2) Date: Nov. 12, 2021

(87) PCT Pub. No.: WO2020/231335
PCT Pub. Date: Nov. 19, 2020

(65) Prior Publication Data
US 2022/0228561 A1 Jul. 21, 2022

(30) Foreign Application Priority Data
May 14, 2019 (GB) ...................................... 1906779

(51) Int. Cl.
| | |
|---|---|
| *F03D 9/00* | (2016.01) |
| *F03D 1/04* | (2006.01) |
| *F03D 9/37* | (2016.01) |
| *F03D 13/20* | (2016.01) |
| *F03D 80/60* | (2016.01) |
| *F03G 6/04* | (2006.01) |
| *F24S 90/00* | (2018.01) |

(52) U.S. Cl.
CPC ............... *F03D 9/007* (2013.01); *F03D 1/04* (2013.01); *F03D 9/37* (2016.05); *F03D 13/20* (2016.05); *F03D 80/60* (2016.05); *F03G 6/045* (2013.01); *F05B 2240/131* (2013.01); *F05B 2260/24* (2013.01); *F24S 90/00* (2018.05)

(58) Field of Classification Search
CPC ... F03D 9/007; F03D 1/04; F03D 9/37; F03D 13/20; F03D 80/60; F03G 6/045; F05B 2240/131; F05B 2260/24; F24S 90/00
See application file for complete search history.

(56) References Cited

U.S. PATENT DOCUMENTS

| | | | | |
|---|---|---|---|---|
| 4,481,774 | A * | 11/1984 | Snook | F24S 80/50 |
| | | | | 60/641.14 |
| 2006/0156725 | A1* | 7/2006 | Kenessey | F24S 90/00 |
| | | | | 60/650 |
| 2019/0040849 | A1* | 2/2019 | Butler | F03G 6/045 |

FOREIGN PATENT DOCUMENTS

| | | |
|---|---|---|
| DE | 10217529 A1 | 11/2003 |
| EP | 1790918 A1 | 5/2007 |

\* cited by examiner

*Primary Examiner* — Mickey H France
(74) *Attorney, Agent, or Firm* — Alexander Postnikov

(57) ABSTRACT

In general terms the present invention proposes a device 100 for harvesting renewable energy. The device 100 comprises a wind turbine 140, a channel 160 for directing wind 198 to the wind turbine 140, and a solar receiver 155 positioned on an internal of the channel 160 for receiving sunlight 194 entering the channel 160.

18 Claims, 2 Drawing Sheets

ENERGY HARVESTING DEVICE

TECHNICAL FIELD

This invention relates to the utilisation of renewable resources to generate energy. In particular, though not exclusively, this invention relates to a device for harvesting renewable energy, a building having the device installed thereon, and a method of enhancing the efficiency of a wind turbine.

BACKGROUND

Global concern about electrical consumption and environmental sustainability has prompted the application of renewable energy sources in buildings. As the world population, at large, continues to migrate to cities, buildings are being built to increasing heights. In high-rise buildings, rooftops are typically used to install photovoltaic (PV) systems. However, as buildings are becoming taller, the available roof space per living unit is no longer adequate to meet the energy demand of buildings.

While PV or solar hot water (SHW) panels can be directly integrated into building façades, such strategies remain relatively unpopular, due to the lower solar intensity received on the vertical sides of buildings. Coupled with the high cost of PV and SHW panels, which means longer return on investments, such solutions have remained unpopular in high-rise buildings.

There remains a need for improved renewable energy systems that can generate electricity, heated water, and provide enhancement of thermal performance.

It is an object of the invention to address at least one of the above problems, or another problem associated with the prior art.

SUMMARY OF THE INVENTION

A first aspect of the invention provides an energy harvesting device comprising: a wind turbine; a channel for directing wind to the wind turbine; and a solar receiver positioned on an internal of the channel for receiving sunlight entering the channel.

It has now been found that sunlight striking a solar receiver within a wind directing channel can heat air present in the channel. This can create an area of low pressure in the channel to help accelerate air in the channel towards the wind turbine. Advantageously, more energy may therefore be generated by the wind turbine for a given wind speed, and the wind turbine may be capable of generating energy at lower wind speeds.

In an embodiment, the channel directs wind to a plurality of wind turbines of the device, and optionally comprises a plurality of solar receivers. The presence of a plurality of wind turbines, and optionally solar receivers, advantageously increases the amount of energy that can be generated by the energy harvesting device.

The channel may have a length defined by the path taken by wind from an opening of the channel to the wind turbine and a width that is transverse to the length. Suitably, the channel may be elongate in width.

Conveniently, the presence of a channel elongate in width means that the energy harvesting device itself may be generally elongate in shape and can readily encompass a plurality of wind turbines and/or solar receivers if desired. This may advantageously facilitate installation of the energy harvesting device on building façades or the like. For example, an elongate energy harvesting device may be installed on the façade of a building in a horizontal position above or below a window, or in a vertical position alongside a window.

To further enhance the efficiency of the device, in an embodiment, the energy harvesting device may comprise a solar concentrator for directing sunlight to the solar receiver. The solar concentrator may, for example, comprise a lens for focusing sunlight onto the solar receiver. Suitably, the solar concentrator may comprise a Fresnel lens. By directing and/or focusing sunlight onto the solar receiver, the amount of energy that can be generated by the energy harvesting device is advantageously increased.

To help increase the amount of sunlight received by the solar receiver throughout the day, the channel bearing the solar receiver (or indeed the device as a whole) may be rotatable about at least one axis, thereby allowing the channel to follow the movement of the sun in a single plane. Suitably, the channel bearing the solar receiver (or the device as a whole) may be rotatable about at least two axes, thereby allowing the channel to follow the movement of the sun throughout the day in two directional planes (e.g. both horizontally and vertically according to the sun path).

In an embodiment, the energy harvesting device may comprise an elongate trough defining the channel. Suitably the trough may comprise a base, first and second elongate sides and an opening. Optionally, the trough may comprise first and/or second ends. One or both of the ends may be capped by an end wall.

The wind turbine (or a plurality of wind turbines) may be positioned in the base of the tough. In this manner, the first and second elongate sides form a channel for directing wind from the opening to the one or more wind turbines. Conveniently, the one or more wind turbines may optionally be mounted within one or more apertures in the base.

In some embodiments, the one or more solar receivers are positioned on the first side of the trough. Suitably, in such embodiments, the second side of the trough may advantageously comprise one or more solar concentrators. This arrangement allows sunlight to be directed and/or concentrated across the channel onto the one or more solar receivers mounted on the second side of the trough inside the channel. Advantageously, this can result in air in the channel being warmed by the sunlight directed and/or concentrated across the channel, thereby creating an area of low pressure in the channel. As aforementioned, this can accelerate air in the channel towards the wind turbine.

Suitably, the trough of the energy harvesting device (or indeed the device as a whole) may be rotatable about an axis running generally along the longitudinal length thereof. Thus, if the energy harvesting device is attached to a surface (e.g. a building façade) so that the longitudinal length of the trough is substantially parallel to the Earth's surface, the trough may be rotated up or down about its longitudinal axis to follow the movement of the sun as it rises and falls in the sky throughout the day. This can advantageously increase the amount of sunlight entering the trough, and therefore received by the solar receiver throughout the day.

Suitably, the trough of the energy harvesting device may be rotatable about an axis generally orthogonal to the longitudinal length thereof. Thus, if the energy harvesting device is attached to a surface (e.g. a building façade) the trough may be rotated clockwise or anticlockwise relative the surface to follow the movement of the sun as it moves across the sky (i.e. East or West) throughout the day. This can advantageously increase the amount of sunlight entering the trough, and therefore received by the solar receiver throughout the day.

Advantageously, the trough (or the energy harvesting device as a whole) may be rotatable about an axis running generally along the longitudinal length thereof and rotatable about an axis generally orthogonal to the longitudinal length thereof, thereby allowing the trough to follow the movement of the sun throughout the day in two directional planes (e.g. both horizontally and vertically according to the sun path).

The term "wind turbine" is used herein to refer to any device capable of capturing the kinetic energy of wind, suitably by converting it into a more readily usable form of energy, for example electrical energy or heat energy. Suitably, a wind turbine may comprise at least one blade attached to a shaft. When wind flows across the blade, the air pressure on one side of the blade decreases. The difference in air pressure across the two sides of the blade creates both lift and drag forces. When the lift force is stronger than the drag force, the blade rotates about its axis, resulting in rotation of the shaft to generate mechanical energy, which can be used directly or further converted into other forms of energy.

In some embodiments, the wind turbine may comprise an axis of rotation generally parallel to wind flow therethrough. Alternatively, the wind turbine may comprise an axis of rotation generally perpendicular to wind flow therethrough. Suitably, the wind turbine may be a Savonius-type wind turbine.

The solar receiver may be any device suitable for receiving solar radiation to facilitate its use as energy. Suitably, the solar receiver may be arranged to convert solar radiation to electrical and/or thermal energy. The solar receiver may, for example, comprise a photovoltaic (PV) cell and/or a solar thermal panel (e.g. solar hot water or through-pass air). The solar receiver may comprise one or more secondary solar concentrators. Suitable solar receivers are known in the art.

In embodiments where the solar receiver is a PV cell, the movement of air through the channel towards the wind turbine can create a flow of air over the PV cell, thereby cooling it. It is known that the performance of PV cells decreases as the temperature of a PV cell increases (see, for example, Zubeer, S. A. et. al. 2017, E3S Web of Conferences, 22, 00205). Therefore, this cooling of the PV cell by air flowing through the channel advantageously results in improved performance of the PV cell, and hence increases the energy output of the energy harvesting device.

Suitably, energy harvested by the wind turbine and/or the solar collector may be converted to electricity.

Advantageously, the energy harvesting device may be oriented or mounted such that the channel leads upwardly to the wind turbine. In particular, the channel may lead from an opening having a relatively lower position to the wind turbine having a relatively higher position. Such orientation or positioning of the device advantageously facilitates heated air flow through the wind turbine, enhancing efficiency.

A second aspect of the invention provides a building having installed thereon an energy harvesting device according to the first aspect of the invention or an array of energy harvesting devices according to the first aspect of the invention.

The energy harvesting device(s) may suitably be installed on a façade of the building. The building may advantageously be arranged to utilise solar and/or wind energy harvested by the energy harvesting device(s).

A third aspect of the invention provides a method of enhancing the efficiency of a wind turbine, the method comprising: channelling wind to the wind turbine through a channel comprising, mounted on an internal thereof, a solar receiver for receiving sunlight entering the channel.

The method may comprise the step of rotating a trough defining the channel to enhance solar irradiation of the solar receiver.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
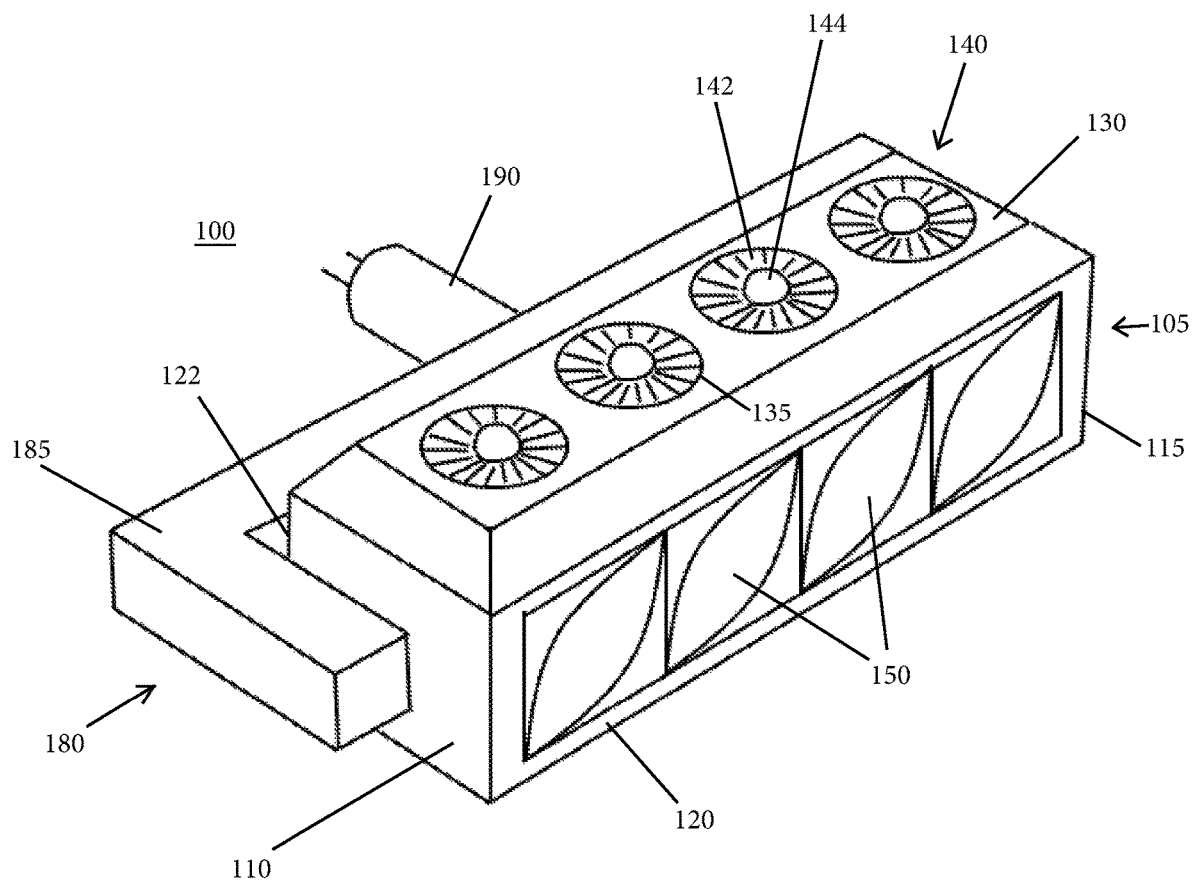
FIG. 1 is a perspective view of an energy harvesting device in accordance with an embodiment of the invention.

Referring to FIG. 1, an energy harvesting device 100 according to an embodiment of the invention comprises an elongate trough 105 attached to a mount 180.

The mount comprises an arm portion 185 which is attached to opposing first and second end walls 110, 115 of the trough 105. The arm portion 185 is attached an actuator 190 which can rotate the arm portion 185 clockwise or anticlockwise about its axis. The actuator 190 may suitably be attached to the façade of a building (not shown). The arm portion 185 can rotate the trough 105 about its longitudinal axis.

As will be discussed in more detail below, the trough 105 comprises a first side 120, a second side 122, and a base portion 130. The ends of the first and second sides 120, 122 are capped by first and second end walls 110, 115. The base portion 130 has four apertures 135, inside each of which sits a vertical axis wind turbine 140. Each wind turbine 140 has a set of blades 142 attached to a rotor shaft 144. The first side 120 of the trough 105 is made up of four Fresnel lenses 150, which are arranged to direct and focus incident sunlight into the trough 105.

Figure 2:
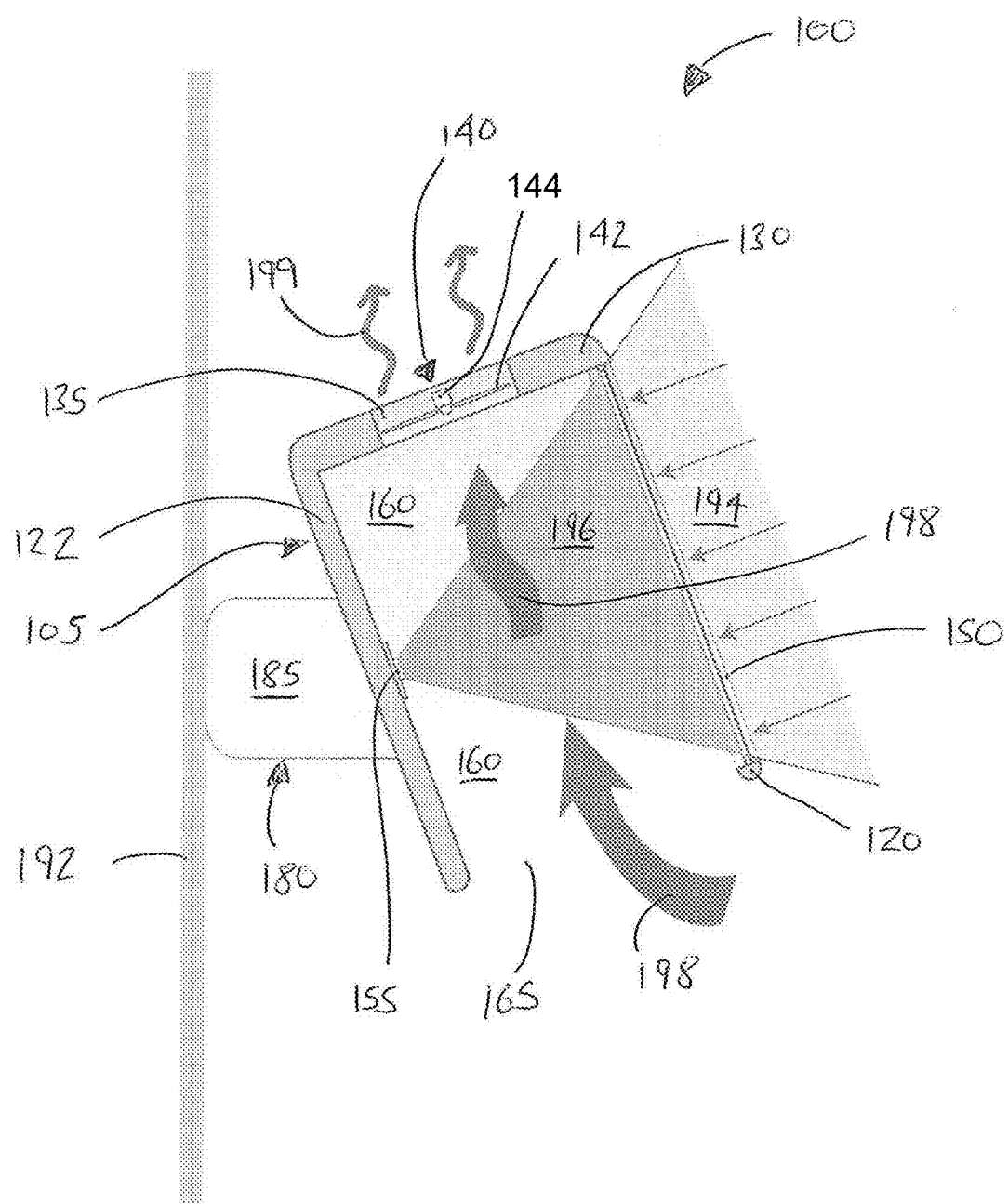
FIG. 2 is a cross sectional view of the energy harvesting device of FIG. 1 showing wind directed to a wind turbine and light propagating to a solar receiver.

Referring now to FIG. 2, which provides a cross sectional view of the energy harvesting device 100 of FIG. 1, the trough 105 defines a channel 160 having an opening 165.

The trough 105 is installed on the façade of a building 192 so that its longitudinal axis is horizontal with respect to the ground (not shown). For example, the solar concentrator 100 may be installed on the façade of a building 192 in a horizontal position above a window.

Incident sunlight 194 enters the trough 105 via Fresnel lenses 150 in the first side 120 of the trough 105, to provide concentrated sunlight 196 inside the channel 160. Concentrated sunlight 196 is directed and focused by Fresnel lenses 150 onto a solar receiver 155 positioned on the second side 122 of the trough 105, inside the channel 160. The solar receiver 155 can convert the received concentrated sunlight 196 into electrical or heat energy for use in the building 192 to which it is attached.

The concentrated sunlight 196 also increases the temperature of the air in the channel 160. This creates an area of low pressure within the channel 160, which draws wind 198 through the channel 160 and accelerates it towards wind turbine 140. Wind 198 flows across the blades 142 of the wind turbine 140, through the aperture 135, causing the blades 142 to rotate about their axis. This results in rotation of the shaft 144 to generate mechanical energy, which can be converted into electrical or heat energy for use in the building 192 to which it is attached. Wind 198 exits the aperture 135 of base portion 130 as exhaust air stream 199.

The invention claimed is:

1. An energy harvesting device comprising:
   a wind turbine;
   a channel for directing wind to the wind turbine;
   a solar receiver positioned on an internal of the channel for receiving sunlight entering the channel; and
   wherein the channel bearing the solar receiver is rotatable around at least one axis.

2. The device of claim 1, wherein the channel is configured to direct wind to a plurality of wind turbines.

3. The device of claim 1, further comprising a solar concentrator for directing sunlight to the solar receiver.

4. The device of claim 3, wherein the solar concentrator comprises a lens, optionally a Fresnel lens.

5. The device of claim 1, further comprising an elongated trough defining the channel, the trough comprising:
   a base;
   a first elongated side and a second elongate side; and
   an opening.

6. The device of claim 5, wherein the wind turbine is positioned on the base of the trough, optionally mounted within an aperture of the base.

7. The device of claim 5, wherein the solar receiver is positioned on the first side of the trough.

8. The device of claim 5, wherein the second side of the trough comprises a solar concentrator.

9. The device of claim 5, wherein the trough is rotatable about an axis running along the longitudinal length thereof.

10. The device of claim 5, wherein the trough is rotatable about an axis orthogonal to the longitudinal length thereof.

11. The device of claim 1, wherein the wind turbine comprises an axis of rotation parallel to wind flow therethrough.

12. The device of claim 1, wherein the wind turbine comprises an axis of rotation perpendicular to wind flow therethrough.

13. The device of claim 1, wherein the solar receiver comprises a photovoltaic (PV) cell and/or a solar thermal panel.

14. The device of claim 1, wherein energy harvested by the wind turbine and/or the solar collector is converted to electricity.

15. The device of claim 1, wherein the device is arranged such that the channel leads upwardly to the wind turbine.

16. A building having installed thereon a device of claim 1.

17. The building of claim 16, wherein the building is arranged to utilize solar and/or wind energy harvested by the device.

18. A method of enhancing the efficiency of a wind turbine, the method comprising:
   channeling wind to the wind turbine through a channel comprising a solar receiver for receiving sunlight entering the channel, the solar receiver mounted on an interior surface of the channel; and
   rotating a trough defining the channel to enhance solar irradiation of the solar receiver.

* * * * *